United States Patent
El-Reedy et al.

(10) Patent No.: US 7,151,895 B2
(45) Date of Patent: Dec. 19, 2006

(54) METHOD AND SYSTEM FOR AUTOMATICALLY SETTING GAIN FOR AN AMPLIFIER IN AN OPTICAL NETWORK

(75) Inventors: Jamil Omar-Hatem El-Reedy, Allen, TX (US); Kumar Vijay Peddanarappagari, Plano, TX (US); Emir Catovic, Plano, TX (US); Paparao Palacharla, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 10/648,952

(22) Filed: Aug. 26, 2003

(65) Prior Publication Data

US 2005/0047781 A1  Mar. 3, 2005

(51) Int. Cl.
*H04B 10/08* (2006.01)
*H01S 3/00* (2006.01)

(52) U.S. Cl. .................. 398/37; 359/341.41
(58) Field of Classification Search ............... 398/37, 398/181; 359/341.41, 341.42
See application file for complete search history.

(56) References Cited

U.S. PATENT DOCUMENTS

| | | | | |
|---|---|---|---|---|
| 5,260,819 A * | 11/1993 | Hadjifotiou et al. | .......... | 398/11 |
| 5,296,957 A * | 3/1994 | Takahashi et al. | .......... | 398/177 |
| 5,383,046 A * | 1/1995 | Tomofuji et al. | .......... | 398/181 |
| 5,483,233 A * | 1/1996 | Pettitt et al. | .......... | 340/870.26 |
| 5,673,142 A * | 9/1997 | Fatehi et al. | .......... | 359/341.41 |
| 6,038,063 A * | 3/2000 | Tsuda et al. | .......... | 359/341.41 |
| 6,134,047 A * | 10/2000 | Flood et al. | .......... | 359/337.12 |
| 6,288,836 B1 * | 9/2001 | Kawasaki et al. | .......... | 359/341.42 |
| 6,299,631 B1 * | 10/2001 | Shalaby | .......... | 606/214 |
| 6,411,429 B1 * | 6/2002 | Tomofuji et al. | .......... | 359/337 |
| 6,560,008 B1 * | 5/2003 | Wada | .......... | 359/337 |
| 6,687,045 B1 * | 2/2004 | Lelic | .......... | 359/337.1 |
| 2002/0060837 A1 * | 5/2002 | Inagaki et al. | .......... | 359/337 |
| 2004/0071392 A1 * | 4/2004 | Lauder | .......... | 385/17 |

OTHER PUBLICATIONS

Agrawal, Govind P. Fiber-Optic Communication Systems. 3rd Edition. Wiley-Interscience. 2002. pp. 518-519.*
PHOTOTURIS/Wavelength power.SONET simplicity,http://www.photuris.com/ 2003/news/mediakit.shtml, printed Aug. 21, 2003, 2 pages.
U.S. Appl. No. 10/448,579, entitled *"Method and System for Determining Gain for an Optical Signal"*, inventors Cechan Tian, et al., filed May 29, 2003, 29 pages specification, claims and abstract and 3 sheets of drawings.
Phototuris product brochure, printed from http://www.photuris.com/2003/docs/V32000-brochure.pdf on Aug. 21, 2003, 4 pages.

* cited by examiner

*Primary Examiner*—Deandra M. Hughes
(74) *Attorney, Agent, or Firm*—Baker Botts L.L.P.

(57) ABSTRACT

A method for automatically setting a gain for an amplifier in an optical network includes transmitting, from a source proximate an upstream amplifier coupled to an optical span, a stable signal over the optical span. The method also includes using the stable signal at a downstream amplifier coupled to the optical span to automatically set a gain of the downstream amplifier.

20 Claims, 2 Drawing Sheets

METHOD AND SYSTEM FOR AUTOMATICALLY SETTING GAIN FOR AN AMPLIFIER IN AN OPTICAL NETWORK

TECHNICAL FIELD

The technical field is optical communication networks and, more particularly, a method and system for automatically setting gain for an amplifier in an optical network.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of each of the channels.

Sustaining power levels of optical signals in optical networks presents substantial technical challenges. It is desirable for the power of the signals to be within a dynamic range of the receivers in an optical network, and the dynamic range of the receivers tends to be smaller for higher data rates. Consequently, it is important to employ an accurate method for assessing the necessary level of amplification in the nodes in an optical network.

Due to fast switching speeds required for optical layer protection, optical amplifiers must be capable of quietly accepting the signals and capable of a fast transient response. Since fiber losses may be different for different spans, the gain of an amplifier may need to be determined during span installation and during span recovery after repair of a fiber cut. Moreover, spans with no provisioned or active wavelengths will need to operate normally after wavelengths are switched to such spans due to optical layer switching.

SUMMARY

A method and system for automatically setting a gain for an amplifier of an optical network is provided that substantially eliminates or reduces at least some of the disadvantages and problems associated with previous methods and systems for determining amplifier gain.

In accordance with a particular embodiment, a method for automatically setting a gain for an amplifier in an optical network includes transmitting, from a source proximate an upstream amplifier coupled to an optical span, a stable signal over the optical span. The method also includes using the stable signal at a downstream amplifier coupled to the optical span to automatically set a gain of the downstream amplifier.

The source may comprise the upstream amplifier. The stable signal may comprise amplified spontaneous emission (ASE) of the upstream amplifier. The method may include communicating power level information of the stable signal to the downstream amplifier to be used to automatically set the gain of the downstream amplifier. Communicating power level information of the stable signal to the downstream amplifier may comprise communicating power level information of the stable signal over an optical supervisory channel (OSC). The stable signal may comprise a signal having a power variation over time of approximately 1 dB or less, and the stable signal may be a broadband signal.

The method may also include transmitting a request over an optical supervisory channel (OSC) for transmission of a stable signal for setting gain automatically and notifying the upstream amplifier that the gain of the downstream amplifier has been set. The method may include activating a setup mode of the upstream amplifier and the downstream amplifier before transmitting the stable signal over the optical span. The method may also include transitioning the upstream amplifier and the downstream amplifier to a normal operation mode after using the stable signal at the downstream amplifier to automatically set the gain of the downstream amplifier.

In accordance with another embodiment, a system for automatically setting a gain for an amplifier in an optical network includes a source proximate an upstream amplifier coupled to an optical span. The source is operable to transmit a stable signal over the optical span. The system includes a downstream amplifier coupled to the optical span. The downstream amplifier is operable to use the stable signal to automatically set a gain of the downstream amplifier.

The source may comprise the upstream amplifier. The stable signal may comprise ASE of the upstream amplifier. The upstream amplifier and the downstream amplifier may be operable to enter into a setup mode before transmission of the stable signal over the optical span, and the upstream amplifier and the downstream amplifier may be operable to transition to a normal operation mode after using the stable signal at the downstream amplifier to automatically set the gain of the downstream amplifier.

Technical advantages of particular embodiments include a method for automatically setting a gain of a downstream amplifier so that the span to which it is coupled may be brought into service quickly when needed. The automatic setting of the amplifier gain also enables customers or other users to set up spans without having to use transponder equipment therefore providing plug-and-play capability. The setup process becomes easier and less complicated, because it requires less manual labor and is less prone to manual errors. Moreover, after a failure of a particular span has been repaired, the setting of gain automatically eliminates manual loss measurement thus providing automatic span recovery after span failure.

Other technical advantages will be readily apparent to one skilled in the art from the following figures, descriptions and claims. Moreover, while specific advantages have been enumerated above, various embodiments may include all, some or none of the enumerated advantages.

DETAILED DESCRIPTION OF THE INVENTION

Figure 1:
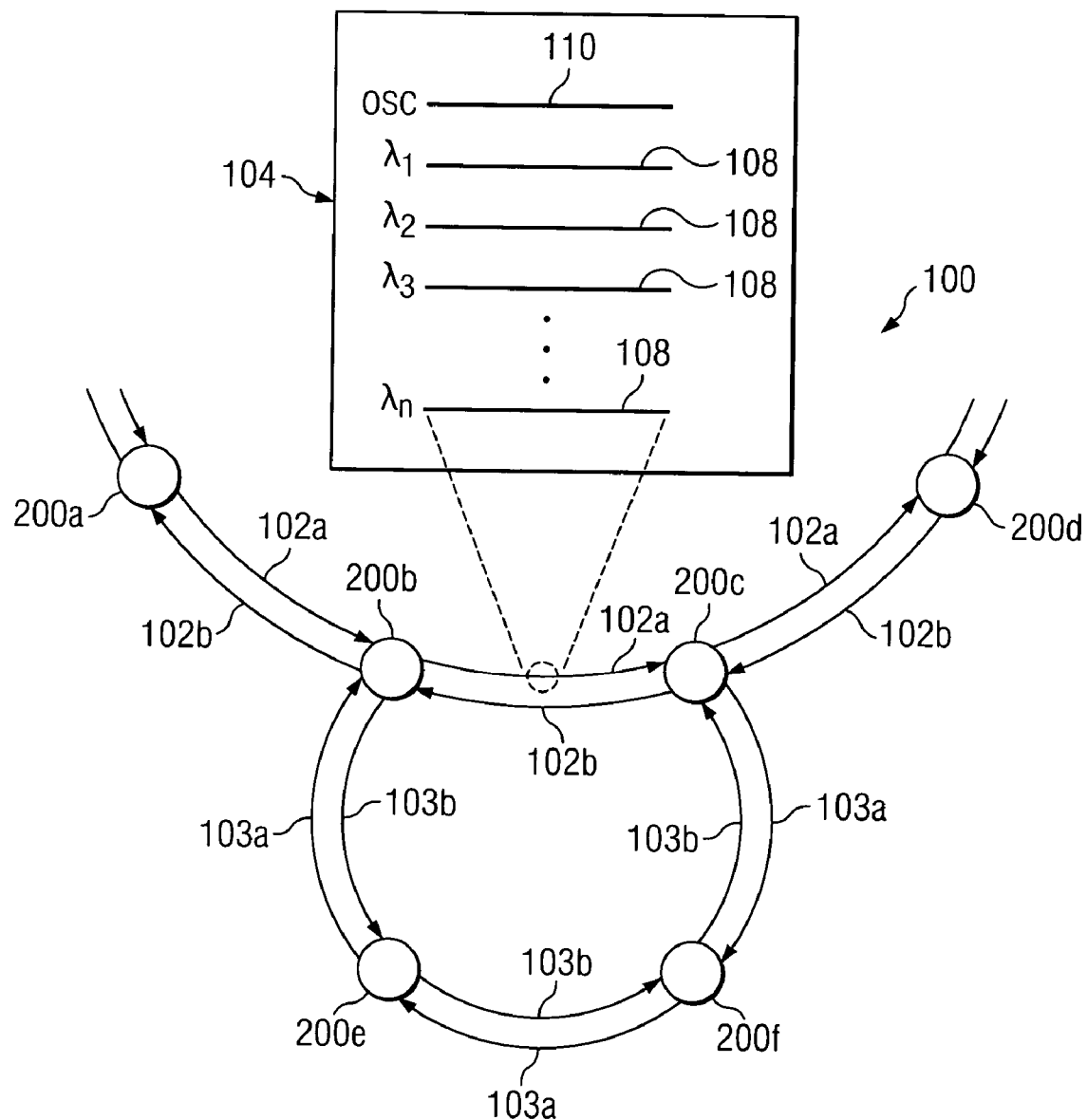
FIG. 1 illustrates one embodiment of an optical communication network with network nodes.

FIG. 1 illustrates an optical network 100 that communicates information between network nodes 200 using optical spans 102 and 103. Optical network 100 generally represents any collection of hardware and/or software that communicates information between network nodes 200 in the form of optical signals. In a particular embodiment, optical network 100 uses wavelength division multiplexing (WDM) or dense wavelength division multiplexing (DWDM) to communicate information on multiple channels, each channel using a different wavelength. Network nodes 200, referring generally to nodes 200a, 200b, 200c, 200d, 200e and 200f represent any hardware and/or software that receives information carried in optical network 100 in the form of optical signals, processes that information in any suitable fashion, and/or communicates information to optical network 100. Nodes 200 may include optical switches, amplifiers, add-drop multiplexers, optical-electronic converters, or any other suitable hardware and/or software for processing optical signals.

Spans 102 and 103 between network nodes 200 represent any suitable links for communicating optical signals 104 between network nodes 200. As such, spans 102 and 103 may include any manner of optical communication medium, including optical fibers such as single-mode fiber, dispersion compensation fiber, dispersion-shifted fiber, non-zero dispersion shifted fiber. Spans 102 and 103 may carry information using any suitable format or protocol, including frame relay, asynchronous transfer mode (ATM), synchronous optical network (SONET), or any other suitable method of communication. Spans 102 and 103 may be unidirectional or bidirectional. In many networks, there is an "eastbound" path traveling clockwise around optical network 100, and a "westbound" path, which communicates information counterclockwise around optical network 100. Each span 102 and 103 may include one or multiple optical fibers or other media for communicating optical signals 104, and nodes 200 of optical network 100 may be arranged in any suitable configuration, including rings, stars, mesh or other suitable network configuration.

In particular embodiments, spans 102 and 103 carry optical signals 104 that have a wavelength spectrum of the form shown in FIG. 1. In signal 104, the optical information is apportioned in several different wavelengths 108. Each wavelength 108 represents a particular channel. Information carried on span 102 and 103 may be assigned to any particular wavelength 108 in optical signal 104. Using appropriate equipment, wavelengths 108 may be added, dropped, switched, or otherwise processed separately. Signal 104 also includes an optical supervisory channel (OSC) 110 that represents one or more wavelengths assigned to carry information used for management of network 100. For example, OSC 110 may communicate status information for the channels 108 indicating whether each channel 108 is provisioned and whether there has been an error detected in communication of channel 108. The OSC may be an in- or out-of-band channel. An in-band OSC channel may be, for example, a channel inside the WDM band. Any number of wavelengths may be assigned to OSC 110 for carrying network management information.

As optical signals 104 are communicated in spans 102 and 103, they are attenuated by interactions of signals 104 with the optical media of spans 102 and 103. The attenuation in optical signals 104 from being communicated in spans 102 and 103 is known as "span loss." This span loss, together with other optical components, reduces the power of optical channels. Because receivers in an optical network function optimally within a certain dynamic range, optical amplifiers are used to compensate for the decreased power of optical signals.

One method of compensating for span loss involves the use of erbium-doped fiber amplification (EDFA). In EDFA, erbium-doped optical fibers are driven to excited states by a pumping laser, producing population inversion with excited erbium particles that amplify optical signals. The gain of the EDFA is set so that the power levels of the signals arriving at the receivers are within the dynamic range of the receivers.

Network 100 is a dynamic network with fast provisioning and optical layer protection switching, for example, an Optically Shared Path Protection Ring (OSPPR). In this embodiment, any of spans 102 and 103, or particular channels of such span, not in use at a given time are able to be quickly put to use when desired (e.g., in approximately fifty milliseconds in particular embodiments). As an example, traffic may be currently communicated on spans 102 through nodes 200a, 200b, 200c and 200d while spans 103 between nodes 200b and 200e, 200e and 200f, and 200f and 200c are dark or inactive, communicating no substantial optical traffic. If a fiber cut occurs on a span 102 between nodes 200b and 200c, then spans 103 may be needed quickly to communicate optical traffic between nodes 200b and 200c (via nodes 200e and 200f through spans 103). In order to activate spans 103 in the shortest amount of time possible, certain characteristics and parameters involving spans 103 must already be set, including the gain of amplifiers coupled to the spans. Thus, the gains of the amplifiers in nodes 200b, 200c, 200e and 200f must be already determined and set enabling amplifiers to be in a "standby" or "ready" mode for quick provisioning. This is particularly true for the gain of preamplifiers of nodes downstream of a particular span, because those pre-amplifiers compensate for the attenuation of optical signals resulting from the span loss.

Particular embodiments provide a manner to automatically set the gains of such pre- or downstream amplifiers so that the spans to which they are coupled may be brought into service quickly when needed. In addition, the automatic setting of the amplifier gain may enable customers or other users to set up spans without having to use transponder equipment therefore providing plug-and-play capability. The setup process becomes easier and less complicated, because it requires less manual labor and is less prone to manual errors. Moreover, after a failure of a particular span has been repaired, the automatic gain setting may eliminate or reduce manual loss measurement thus providing automatic span recovery after span failure. Particular embodiments may be utilized in any optical network, such as a longhaul or metro network. Use in a metro network may be particularly advantageous because of the need for dynamic provisioning in such networks.

Figure 2:
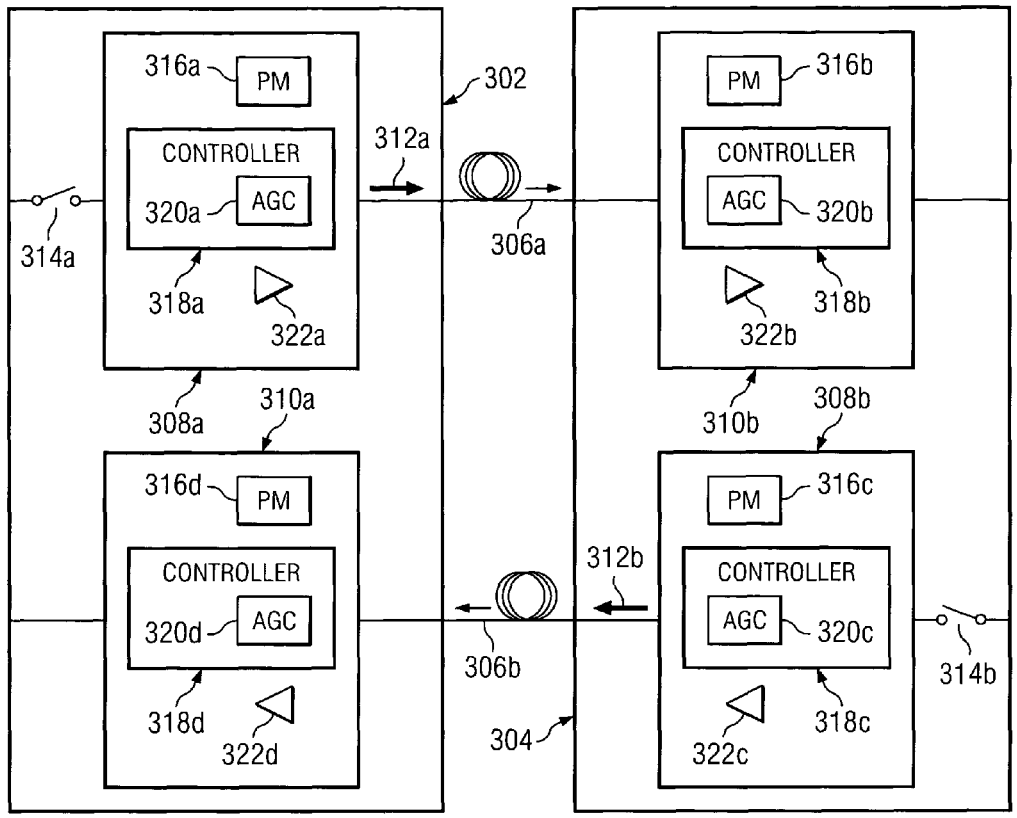
FIG. 2 illustrates an embodiment of two nodes of an optical network coupled by a span.

FIG. 2 illustrates a system 300 for automatically setting the gain for amplifiers of an optical network, in accordance with a particular embodiment of the present invention. System 300 includes spans 306 coupling partially-illustrated nodes 302 and 304. Span 306a carries traffic in one direction from node 302 to node 304, and span 306b carries traffic in the opposite direction from node 304 to node 302. In particular embodiments, nodes 302 and 304 may correspond to nodes 200 of network 100 of FIG. 1. For example, nodes 302 and 304 may correspond to nodes 200e and 200f, respectively of FIG. 1 coupled by spans 103.

The illustrated portions of nodes 302 and 304 each includes a post-amplifier 308 and a pre-amplifier 310. Each post-amplifier 308 amplifies traffic exiting its respective node, and each pre-amplifier 310 amplifies traffic entering its respective node. As discussed above with respect to nodes 200 of FIG. 1, nodes 302 and 304 may also include optical switches, add-drop multiplexers, optical-electronic converters or any other suitable hardware and/or software for processing optical signals.

Post-amplifiers 308 and pre-amplifiers 310 include power monitors 316, controllers 318 and gain media 322. Power monitors 316 represent any components for detecting a power level of an optical signal amplified by the amplifiers. Power monitors 316 may include photodiodes, CCDs, light meters or other suitable hardware and/or software for detecting a power level of an optical signal. Power monitors 316 may also communicate measured power levels to other components of the amplifier and other components of nodes of the optical network. Particular embodiments may include amplifiers with more than one power monitor, such as an input power monitor for measuring an input power level of an optical signal received at the amplifier and an output power monitor for measuring an output power level of the optical signal as it exits the amplifier after amplification. Particular embodiments may also include other power monitors of nodes 302 and 304, such as power monitors measuring input and output signals of the nodes.

Controllers 318 control the operation of gain media 322 to produce a selected level of gain. Such selected level of gain may be calculated by controllers 318 as discussed below. In general, controllers 318 operate to maintain the power levels of channels in an optical signal received at the amplifier in an appropriate power range despite phenomena such as span loss and component loss. This may include such tasks as controlling the pumping lasers for gain media 322, receiving information relevant to determining gain (such as power levels and/or number of channels) and other related tasks. Accordingly, controllers 318 may include any suitable hardware and/or software components for performing these and other related functions, including processors, memory (whether volatile or nonvolatile) and communication interfaces. In the depicted embodiment, controllers 318 include automatic gain control (AGC) circuitry 320. AGC 214 refers to the hardware and/or software that manages amplifier gain media 206. The use of AGC circuitry also helps to manage any fast transient response and aids in providing dynamic protection. Particular embodiments may include automatic level control (ALC) for adjusting the attenuation level of a variable attenuator of the amplifier and determining the desired gain using a stable signal transmitted from a source, such as post-amplifier 308 as further discussed below, over the optical span. Amplifiers may be in an AGC mode during normal operation but may switch to an ALC mode to automatically determine the desired gain using the stable signal.

Gain media 322 represent any suitable components for amplifying the power level of a signal received at the amplifier. In a particular embodiment, gain media 322 are erbium-doped fibers that amplify signals and compensate for power tilt using resonance effects. The amount of gain produced by gain media 322 is controlled by controlling the power of a pumping laser (not shown) coupled to gain media 322. Particular embodiments may include gain media 322 in single-stage or multi-stage configurations in a particular amplifier.

Amplifiers in particular embodiments may also include other components, such as variable attenuators for reducing the power level of optical signals received at the amplifiers so that a node may impart a loss to the optical signal that is uniform across all channels. This may be useful because controlling the overall gain of the EDFA using a variable attenuator will not change the population inversion conditions in the gain media. This allows uniform gain across the signal band regardless of the overall EDFA gain. By imparting a uniform loss, variable attenuator may adjust the overall power level without upsetting the balance in channel power produced by EDFA.

As discussed above, during automatic set up of a particular span coupling two nodes, the desired gain of the pre-amplifier of the node downstream of the span, for example pre-amplifier 310b of node 304 downstream of span 306a, is set using a signal 312a transmitted by a source. The source may be an upstream amplifier, for example upstream amplifier 308a, in which case the signal may comprise ASE of the upstream amplifier. In one embodiment, the signal is stable and flat to provide an accurate gain calculation that will be useful for amplification of subsequent traffic communicated over span 306a. The stability of a signal may be measured by the variance of the power of the signal over time. In particular embodiments, a stable signal may be one whose power varies over time by approximately 1 dB or less. The flatness of the signal may be measured by the variance of the power of the signal across the spectrum or a portion of the spectrum of wavelengths communicated over the span. The signal may also be one that is broadband, or one that covers the particular wavelengths or band(s) amplified by the amplifiers of the system. Use of a broadband signal helps to determine a more accurate or useful gain for the pre- or downstream amplifier. The signal may also have a certain minimum power in order to be recoverable at pre-amplifier 310b. Such minimum power may vary in different embodiments, but in some embodiments the minimum power of the signal may be greater than approximately −30 dBm.

In system 300 of FIG. 2, the signal communicated over span 306a to pre-amplifier 310b comprises amplified spontaneous emission (ASE) generated when post-amplifier 308a is activated. The ASE of the post-amplifier is a stable, broadband signal. Other traffic that may be communicated through node 302 and post-amplifier 308a might affect the stability and/or flatness of signal 312a and thus may have a negative impact on the accuracy of the gain calculated for pre-amplifier 310b. Therefore, in one embodiment to help signal 312a to remain stable and flat, a switch 314a may be used to act as a shutter to block any such traffic before it reaches post-amplifier 308a. As a result, the only traffic communicated over span 306a will be signal 312a (ASE from amplifier 308a in this embodiment) to increase the accuracy of gain calculated for pre-amplifier 310b. Other embodiments may include other components or methods other than a switch for blocking other traffic before it reaches post-amplifier 308a.

Power monitor 316a calculates the power of signal 312a before it is affected by or reduced from communication over span 306a. Particular embodiments may include power monitors to calculate power level information of a signal before being amplified by post-amplifier 308a or after being amplified by post-amplifier 308a. Such information may be communicated to controller 318b of pre-amplifier 310b. In some embodiments, such power level information may be predefined or known.

Pre-amplifier 310b receives signal 312a over span 306a, and controller 318b uses such signal to calculate a desired gain for the pre-amplifier. The "use" of the signal to calculate a desired gain shall include any and all indirect or direct use of the signal for gain calculation. Controller 318*b* may use information received from power monitors 316*a* and 316*b* (and any other power monitors which may be utilized) to determine a total gain to be applied by gain media 322*b* to compensate for span loss over span 306*a*. In particular, controller 318*b* may use an output power level of signal 312*a* from post-amplifier 308*a* as a target power level for signal 312*a* after being amplified at pre-amplifier 310*b*. Controller 318*b* may use an input power level of signal 312*a* entering pre-amplifier 310*b* to determine a gain that will be required to produce signals with an output power level from post-amplifier 308*a* matching the power level of signal 312*a* before being communicated over span 306*a*. In particular embodiments, controller 318*b* may take into account other factors, such as the number of channels provisioned, the known or estimated amount of loss from communication through nodes or any other helpful or useful piece of information for determining a desired gain. In particular embodiments, the power of signal 312*a* may be known at controller 318*b* and may not need to be calculated by a power monitor proximate post-amplifier 308*a* before communication over span 306*a*.

As discussed above, in particular embodiments nodes 302 and 304 exchange information so that gain of pre-amplifier 310*b* desired to compensate for span loss over span 306*a* may be calculated. Such information may include, for example, power level information of signal 312*a*. In particular, certain embodiments use in- or out-of-band OSCs of span 306*a* to communicate output power levels of signal 312*a* before the signal is communicated over the span. Thus, pre-amplifier 310*b* may receive output power level information in an OSC from post-amplifier 308*a* for gain calculation. Any of a number of communication protocols may be used, such as OSC bits or IP packets, for communication of information between nodes 302 and 304.

A desired gain for pre-amplifier 310*a* of node 302 may be determined in a similar manner as discussed above with respect to pre-amplifier 310*b* of node 304 to compensate for span loss through span 306*b*. A signal 312*b* may be communicated over span 306*b* for such calculation, and a switch 314*b* may prevent any other traffic from being communicated through post-amplifier 308*b* during such calculation.

Other embodiments of the present invention may include a signal 312*a* other than ASE of the post-amplifier. For example, particular embodiments may include a light emitting diode (LED) proximate post-amplifier 318*a*. An LED is proximate the post-amplifier when it is at a location on an optical span with respect to the post-amplifier that enables the LED to transmit a signal that is usable by a downstream amplifier to determine a desired gain for the downstream amplifier to reasonably compensate for loss over the span. The use of an LED may provide a broadband, stable and flat signal for a more accurate determination of gain at pre-amplifier 316*b*. The LED may be positioned either before or after the post-amplifier. The desired gain of the post-amplifier is typically known since any loss through the node in which the post-amplifier is utilized is usually known before installation and operation. Thus, if an LED is used to transmit signal 312*a* just before the post-amplifier, the gain impact of the post-amplifier can be easily accounted for when measuring the power level of the LED signal at pre-amplifier 316*b* after being communicated over span 306*a*.

In another embodiment, the optical signal used to carry the OSC may be used to transmit a stable and flat signal over span 306*a* to be used for desired gain determination of pre-amplifier 310*b*. An in-band or out-of-band OSC may be utilized. Using an in-band OSC may yield a loss through span 306*a* similar to the loss of the optical signal to be communicated through the span during actual operation after setup has been completed. Use of an out-of-band OSC signal does not use up a wavelength that can be used for optical traffic during operation.

Figure 3:
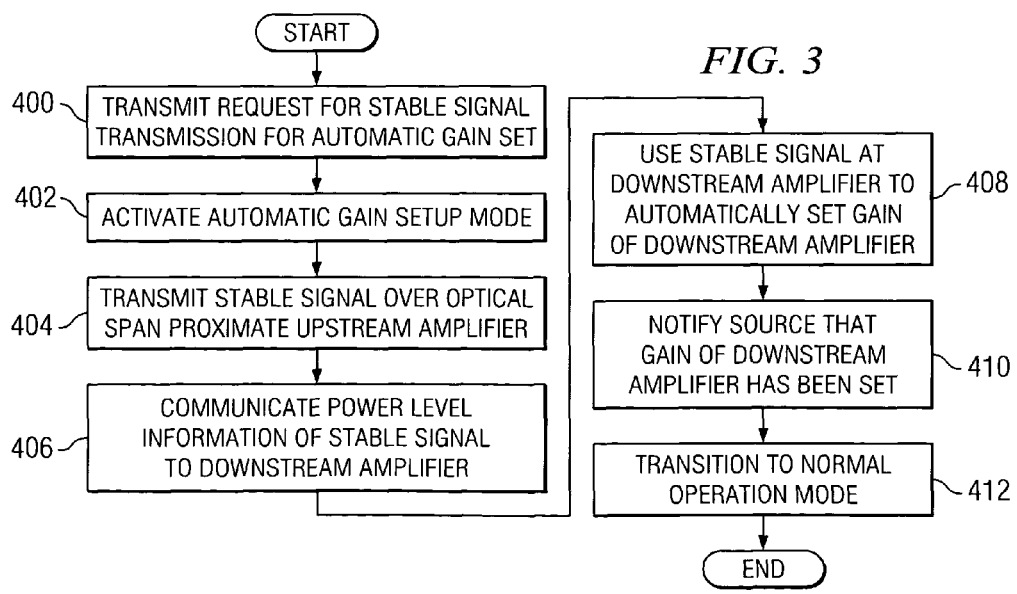
FIG. 3 illustrates an embodiment of a method for automatically setting a gain for an amplifier in an optical network.

FIG. 3 is a flowchart illustrating a method for automatically setting a gain for an amplifier of an optical network, in accordance with a particular embodiment. The method begins at step 400 where a request for a stable signal is transmitted for automatically setting gain of a downstream amplifier. The request may be transmitted by a downstream amplifier to an upstream amplifier over an OSC of an optical span to which the downstream amplifier is coupled. At step 402, an automatic gain setup mode is activated for the downstream amplifier. Such activation may comprise transitioning the downstream amplifier to an ALC mode. In particular embodiments, an upstream amplifier coupled to the optical span may enter an automatic gain setup mode as well for setting the gain of the downstream amplifier.

At step 404, a stable signal is transmitted over the optical span proximate the upstream amplifier. The stable signal may have a power variation over time of approximately 1 dB or less. The signal may also comprise a broadband signal and may be transmitted at a power level such that it will be received at the downstream amplifier at a power level of at least approximately −30 dBm. In particular embodiments, the signal may be transmitted at the upstream amplifier and may comprise ASE of the upstream amplifier. In some embodiments, the signal may be transmitted from an LED proximate the upstream amplifier. At step 406, power level information of the stable signal is communicated to the downstream amplifier. Such power level information may comprise a power level of the signal as it exits the upstream amplifier or as it exits a node in which the upstream amplifier is installed. The power level information may be communicated to the downstream amplifier over an OSC of the optical span.

At step 408, the stable signal is used at the downstream amplifier to automatically set the gain of the downstream amplifier. Such automatic gain set may be accomplished by controller circuitry of the downstream amplifier, and the controller circuitry may use the stable signal power level information communicated to the downstream amplifier to set the gain. At step 410, the downstream amplifier notifies the source that the gain of the downstream amplifier has been set. At this point, the upstream amplifier may stop transmitting the stable signal. At step 412, the amplifiers utilized in the automatic gain setup are transitioned from the gain setup mode to their normal operation mode. This may comprise transitioning the downstream amplifier to an AGC mode.

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within nodes and amplifiers, these elements may be combined, rearranged or positioned in order to accommodate particular routing architectures or needs. In addition, any of these elements may be provided as separate external components to such nodes or amplifiers or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for automatically setting a gain for an amplifier in an optical network, comprising:
    transmitting, from an upstream amplifier coupled to an optical span, a stable signal over the optical span, the stable signal comprising amplified spontaneous emission (ASE) of the upstream amplifier;
    wherein the stable signal is transmitted such that the signal is received at a downstream amplifier coupled to the optical span at a power level of at least approximately −30 dBm;
    using the stable signal comprising the ASE of the upstream amplifier at the downstream amplifier coupled to the optical span to automatically set a gain of the downstream amplifier; and
    blocking optical traffic communicating over the optical span before the optical traffic reaches the upstream amplifier using a shutter coupled to the optical span.

2. The method of claim 1, further comprising communicating power level information of the stable signal to the downstream amplifier to be used to automatically set the gain of the downstream amplifier.

3. The method of claim 2, wherein communicating power level information of the stable signal to the downstream amplifier comprises communicating power level information of the stable signal over an optical supervisory channel (OSC).

4. The method of claim 1, wherein the stable signal comprises a signal having a power variation over time of approximately 1 dB or less.

5. The method of claim 1, wherein the stable signal comprises a broadband signal.

6. The method of claim 1, further comprising transmitting a request over an optical supervisory channel (OSC) for transmission of the stable signal for setting gain automatically.

7. The method of claim 1, further comprising notifying the upstream amplifier that the gain of the downstream amplifier has been set.

8. The method of claim 1, further comprising:
    activating a setup mode of the upstream amplifier and the downstream amplifier before transmitting the stable signal over the optical span; and
    transitioning the upstream amplifier and the downstream amplifier to a normal operation mode after using the stable signal at the downstream amplifier to automatically set the gain of the downstream amplifier.

9. The method of claim 8, wherein:
    activating a setup mode of the downstream amplifier comprises transitioning the downstream amplifier to an automatic level control (ALC) mode; and
    transitioning the downstream amplifier to a normal operation mode comprises transitioning the downstream amplifier to an automatic gain control (AGC) mode.

10. The method of claim 1, wherein the shutter comprises a switch.

11. A system for automatically setting a gain for an amplifier in an optical network, comprising:
    an upstream amplifier coupled to an optical span, the upstream amplifier configured for transmitting a stable signal over the optical span, the stable signal comprising amplified spontaneous emission (ASE) of the upstream amplifier;
    wherein the stable signal is transmitted such that the signal is received at a downstream amplifier coupled to the optical span at a power level of at least approximately −30 dBm;
    the downstream amplifier coupled to the optical span, the downstream amplifier configured for using the stable signal comprising the ASE of the upstream amplifier to automatically set a gain of the downstream amplifier; and
    a shutter coupled to the optical span, the shutter configured for blocking optical traffic communicating over the optical span before the optical traffic reaches the upstream amplifier.

12. The system of claim 11, wherein:
    the upstream amplifier and the downstream amplifier are configured for entering into a setup mode before transmission of the stable signal over the optical span; and
    the upstream amplifier and the downstream amplifier are configured for transitioning to a normal operation mode after using the stable signal at the downstream amplifier to automatically set the gain of the downstream amplifier.

13. The system of claim 12, wherein:
    the downstream amplifier configured for entering into a setup mode comprises the downstream amplifier configured for transitioning to an automatic level control (ALC) mode; and
    the downstream amplifier configured for transitioning to a normal operation mode comprises the downstream amplifier configured for transitioning to an automatic gain control (AGC) mode.

14. The system of claim 11, wherein the upstream amplifier is configured for communicating power level information of the stable signal to the downstream amplifier to be used to automatically set the gain of the downstream amplifier.

15. The system of claim 14, wherein the upstream amplifier is configured for communicating power level information of the stable signal to the downstream amplifier over an optical supervisory channel (OSC).

16. The system of claim 11, wherein the stable signal comprises a signal having a power variation over time of approximately 1 dB or less.

17. The system of claim 11, wherein the stable signal is a broadband signal.

18. The system of claim 11, wherein the downstream amplifier is further configured for transmitting a request over an optical supervisory channel (OSC) for transmission of a stable signal for setting gain automatically.

19. The system of claim 11, wherein the shutter comprises a switch.

20. A method for automatically setting a gain for an amplifier in an optical network, comprising:
    activating an automatic level control (ALC) mode of a downstream amplifier coupled to an optical span;

transmitting, from an upstream amplifier coupled to the optical span, a stable signal over the optical span, the stable signal comprising amplified spontaneous emission (ASE) of the upstream amplifier;
wherein the stable signal is transmitted at a power level such that the signal is received at the downstream amplifier at a power level of at least approximately −30 dBm;
wherein the stable signal comprises a broadband signal comprising a power variation over time of approximately 1 dB or less;
communicating, over an optical supervisory channel (OSC), power level information of the stable signal to the downstream amplifier to be used to automatically set a gain of the downstream amplifier;
using the stable signal and the power level information at the downstream amplifier to automatically set the gain of the downstream amplifier;
notifying the upstream amplifier that the gain of the downstream amplifier has been set;
transitioning the downstream amplifier to an automatic gain control (AGC) mode after using the stable signal and the power level information to automatically set the gain of the downstream amplifier; and
transitioning the upstream amplifier to a normal operation mode after using the stable signal and the power level information at the downstream amplifier to automatically set the gain of the downstream amplifier.

* * * * *